(12) United States Patent
Jeong (10) Patent No.: US 8,075,446 B2
(45) Date of Patent: Dec. 13, 2011

(54) KEY INTERLOCK SYSTEM OF VEHICLE EQUIPPED WITH AUTOMATIC TRANSMISSION

(75) Inventor: Wonjin Jeong, Hwaseong-si (KR)

(73) Assignees: KIA Motors Corporation, Seoul (KR); Hyundai Motor Company, Seoul (KR)

( * ) Notice: Subject to any disclaimer, the term of this patent is extended or adjusted under 35 U.S.C. 154(b) by 380 days.

(21) Appl. No.: 12/507,540

(22) Filed: Jul. 22, 2009

(65) Prior Publication Data
US 2010/0022349 A1 Jan. 28, 2010

(30) Foreign Application Priority Data
Jul. 24, 2008 (KR) .................. 10-2008-0072180

(51) Int. Cl.
*F16H 59/74* (2006.01)
(52) U.S. Cl. .......................................... 477/99
(58) Field of Classification Search ............ 477/99
See application file for complete search history.

(56) References Cited

U.S. PATENT DOCUMENTS

| | | | | |
|---|---|---|---|---|
| 5,810,690 A | * | 9/1998 | Botella et al. | 477/99 |
| 6,783,480 B2 | * | 8/2004 | Masuda et al. | 477/94 |
| 7,597,649 B2 | * | 10/2009 | Wang | 477/99 |
| 2003/0097897 A1 | * | 5/2003 | Yamada et al. | 74/473.21 |
| 2004/0229726 A1 | * | 11/2004 | Wilde et al. | 477/99 |

FOREIGN PATENT DOCUMENTS

| | | |
|---|---|---|
| JP | 09-189353 A | 7/1997 |
| JP | 09-267717 A | 10/1997 |
| JP | 11-042952 A | 2/1999 |
| JP | 2001-018675 A | 1/2001 |

* cited by examiner

*Primary Examiner* — Edwin A Young
(74) *Attorney, Agent, or Firm* — Morgan, Lewis & Bockius LLP (57) ABSTRACT

A key interlock system of a vehicle equipped with an automatic transmission satisfies a condition of a key interlock system that allows a shift lever 3 inserted in a P-range groove (Parking) 2a to be shifted to other ranges (R-range, N-range, and D-range) only by turning a key inserted in a key hole of an ignition lock cylinder 42 to 'ON', and a condition of a key interlock system that allows the key to be removed from the key hole of ignition lock cylinder 42 only when shift lever 3 is positioned at P-range (Parking) 2a, by using a mechanical structure. Therefore, it is possible to achieve a key interlock system that can be manufactured at a low cost, does not make noise, and does not easily break down, as compared with electronic devices.

8 Claims, 7 Drawing Sheets

KEY INTERLOCK SYSTEM OF VEHICLE EQUIPPED WITH AUTOMATIC TRANSMISSION

CROSS-REFERENCE TO RELATED APPLICATIONS

The present application claims priority to Korean Patent Application Number 10-2008-0072180 filed Jul. 24, 2008, the entire contents of which application is incorporated herein for all purposes by this reference.

BACKGROUND OF THE INVENTION

1. Field of the Invention

The present invention relates to a key interlock system of a vehicle equipped with an automatic transmission, which has a mechanical structure.

2. Description of Related Art

In general, key interlock systems of vehicles equipped with an automatic transmission should satisfy two conditions of US Federal Motor Vehicle Safety Standards 114 (FMVSS114).

The first condition is that the shift lever positioned at the P-range (Parking) can shift to other ranges (R-range, N-range, and D-range) only when the key inserted in the ignition lock cylinder is turned to 'ON'. The second condition is that the key can be pulled out of the key hole of the ignition lock cylinder only when the shift lever is positioned at the P-range (Parking).

The key interlock systems of vehicles equipped with an automatic transmission have important functions of preventing safety accidents due to carelessness of drivers and vehicle theft.

Further, most key interlock systems of vehicles equipped with an automatic transmission, which has been widely used, electronic devices that control the operation of the ignition lock switch and key interlock switch, using a solenoid that is operated by control of an ECU (Electronic Control Unit). However, the electronic devices are expensive, make large noise in operation, and easily break down.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a key interlock system of a vehicle equipped with an automatic transmission having a mechanical structure that can be manufactured at a relative low cost, does not practically make noise in operation, and does not easily break down.

In an aspect of the present invention, the key interlock system of a vehicle equipped with an automatic transmission, may include a key interlock cam that is rotatably mounted to a shift lever housing and elastically biased in one direction by an elastic member, one end of the key interlock cam being connected to one end of a key interlock cable, a locking plate slidably disposed in the shift lever housing, the locking plate having a slot member to which the other end of the key interlock cam is slidably inserted and a lever groove to which a shift lever is removably inserted, a cable block slidably coupled to an ignition lock body and being movable along a longitudinal direction thereof, wherein the cable block is connected with the one end of the key interlock cam by the key interlock cable, and has a locking protrusion protruding inside the ignition lock body, and a cylinder block that is integrally formed with an ignition lock cylinder rotatably coupled to the ignition lock body therein and includes a guide channel to selectively receive the locking protrusion therein so as to restrain linear motion of the cable block or rotation of the ignition lock cylinder by retaining the locking protrusion therein while rotating with the ignition lock cylinder.

The slot member may include an incline slot slanted with a predetermined angle with respect to a movement direction of the locking plate, and a horizontal slot formed an upper and/or lower end portion of the incline slot along the movement direction of the locking plate.

The lever groove may be formed on the locking plate in a perpendicular direction to the movement direction of the locking plate.

The key interlock cam may include a rotary shaft that is rotatably fitted in the shift lever housing, a cable protrusion where the one end of the key interlock cable is connected, and a cam protrusion that is inserted in the slot member of the locking plate.

The elastic member may be a spring that is wound around the rotary shaft and of which one end is supported by the shift lever housing and the other end is supported by the key interlock cam, in order to prevent free motion of the key interlock cam.

The key interlock system of the vehicle equipped with the automatic transmission may further include a guide groove formed in the shift lever housing to be open above the shift lever housing, wherein the locking plate is slidably inserted thereto and is positioned apart forward from a P-range groove of a range groove formed through the shift lever housing, on an upper surface of shift lever housing, and is cut such that one end portion thereof is open to one side of the shift lever housing and the other end portion thereof is closed.

The locking plate may include a plate protrusion that is slidably inserted in the guide groove of the shift lever housing, a plate body that integrally bends from the plate protrusion toward the range groove and has the lever groove that is open in the longitudinal direction of the range groove such that the shift lever is inserted thereto, and a flange that is integrally formed with the plate protrusion to protrude from the one side of the shift lever housing through the open end portion of the guide groove and has the slot member that is longitudinally formed along the flange such that the cam protrusion is inserted thereto.

The locking protrusion and the guide channel may be engaged while a start key is positioned at "ON".

According to various aspects of the present invention, it is possible to satisfy a condition of a key interlock system that allows the shift lever inserted in the P-range groove (Parking) to be shifted to other ranges (R-range, N-range, and D-range) only by turning the key inserted in the key hole of the ignition lock cylinder to 'ON', and a condition of a key interlock system that allows the key to be removed from the key hole of ignition lock cylinder only when shift lever is positioned at the P-range (Parking), by using a mechanical structure. Therefore, it is possible to achieve a key interlock system that can be manufactured at a low cost, does not make noise, and does not easily break down, as compared with electronic devices.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

According to various embodiments of the present invention, as shown in FIGS. 1 to 4, a range groove 2 is formed through the upper surface of a shift lever housing 1, the range groove 2 has a P-range groove (Parking) 2a, an R-range groove (Reverse) 2b, an N-range groove (Neutral) 2c, and a D-range groove (Drive) 2d, which are continuously formed.

A shift lever body is rotatably mounted in shift lever housing 1 and a shift lever 3 that is protrude above the upper portion of shift lever housing 1 through range groove 2 is integrally formed with the shift lever body.

As the shift lever body rotates, shift lever 3 shifts along range groove 2 to be selectively positioned to P-range groove 2a, R-range groove 2b, N-range groove 2c, or D-range groove 2d.

Shift lever housing 1 has a guide groove 4, which is formed apart forward from P-range groove 2a of range groove 2 formed through shift lever housing 1, on the upper surface of shift lever housing 1, and is open above shift lever housing 1. Further, guide groove 4 is cut such that one end is open to one side of shift lever housing 1 and the other end faces the other side perpendicularly from one side of shift lever housing 1.

A locking plate 10 is disposed in guide groove 4 of shift lever housing 1 and can slide along guide groove 4.

Locking plate 10 has a plate protrusion 11 that is slidably inserted in guide groove 4 of shift lever housing 1, a plate body 12 that integrally bends from plate protrusion 11 toward range groove 2 and has a lever groove 12a that is open in the longitudinal direction of range groove 2 such that shift lever 3 is inserted thereto, and a flange 13 that is integrally formed with plate protrusion 11 to protrude from one side of shift lever housing 1 through the open end portion of guide groove 4 and has a slot member 16 that is longitudinally formed The slot member 16 may include an incline slot 14 and a horizontal slot 15 formed at least one end portion of the distal ends of the incline slot 14 in the in the opposite directions thereof.

A key interlock cam 20 is rotatably disposed at one side of shift lever housing 1.

That is, key interlock cam 20 is disposed at one side of shift lever housing where guide groove 4 is open.

Interlock cam 20 has a rotary shaft 21 that is rotatably fitted in shift lever housing 1, a cable protrusion 22 where one end of a key interlock cable 31 is connected, and a cam protrusion 23 that is inserted in slot member 16 of locking plate 10.

A spring 32 is wound around rotary shaft 21 of key interlock cam 20, of which one end is supported by shift lever housing 1 and the other end is supported by key interlock cam 23.

Spring 32 provides elastic force to rotate key interlock cam 20 to locking plate 10, such that key interlock cam 20 cannot freely move. Accordingly, cam protrusion 23 of key interlock cam 20 cannot freely move in slot member 16 of locking plate 10, such that it does not make noise.

The other end of key interlock cable 31 with one end connected to cable protrusion 22 of key interlock cam 20 is connected to an ignition lock switch 40.

Figure 3:
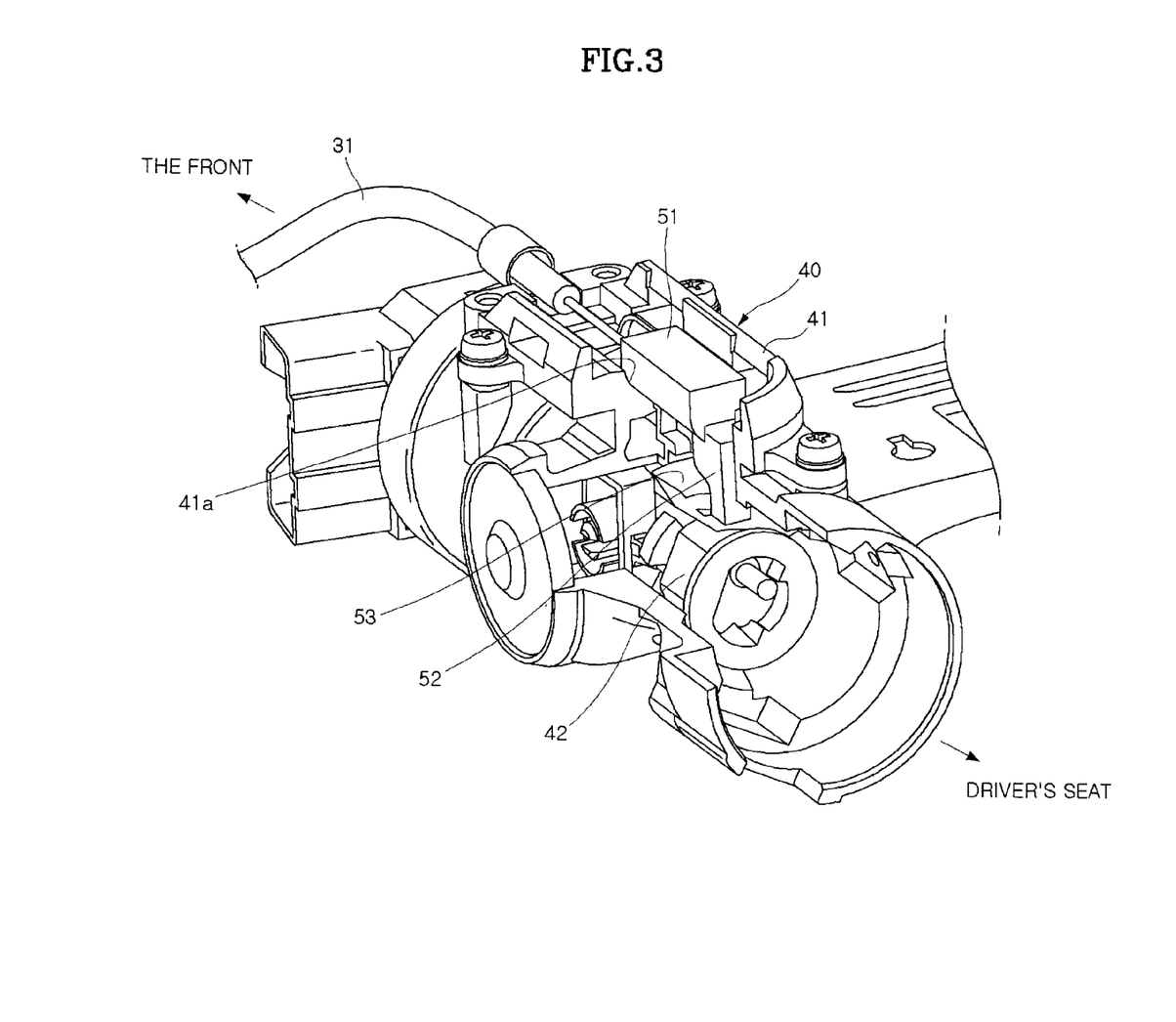
FIGS. 3 and 4 are views illustrating an ignition lock switch included in the exemplary key interlock system according to the present invention.
Figure 4:
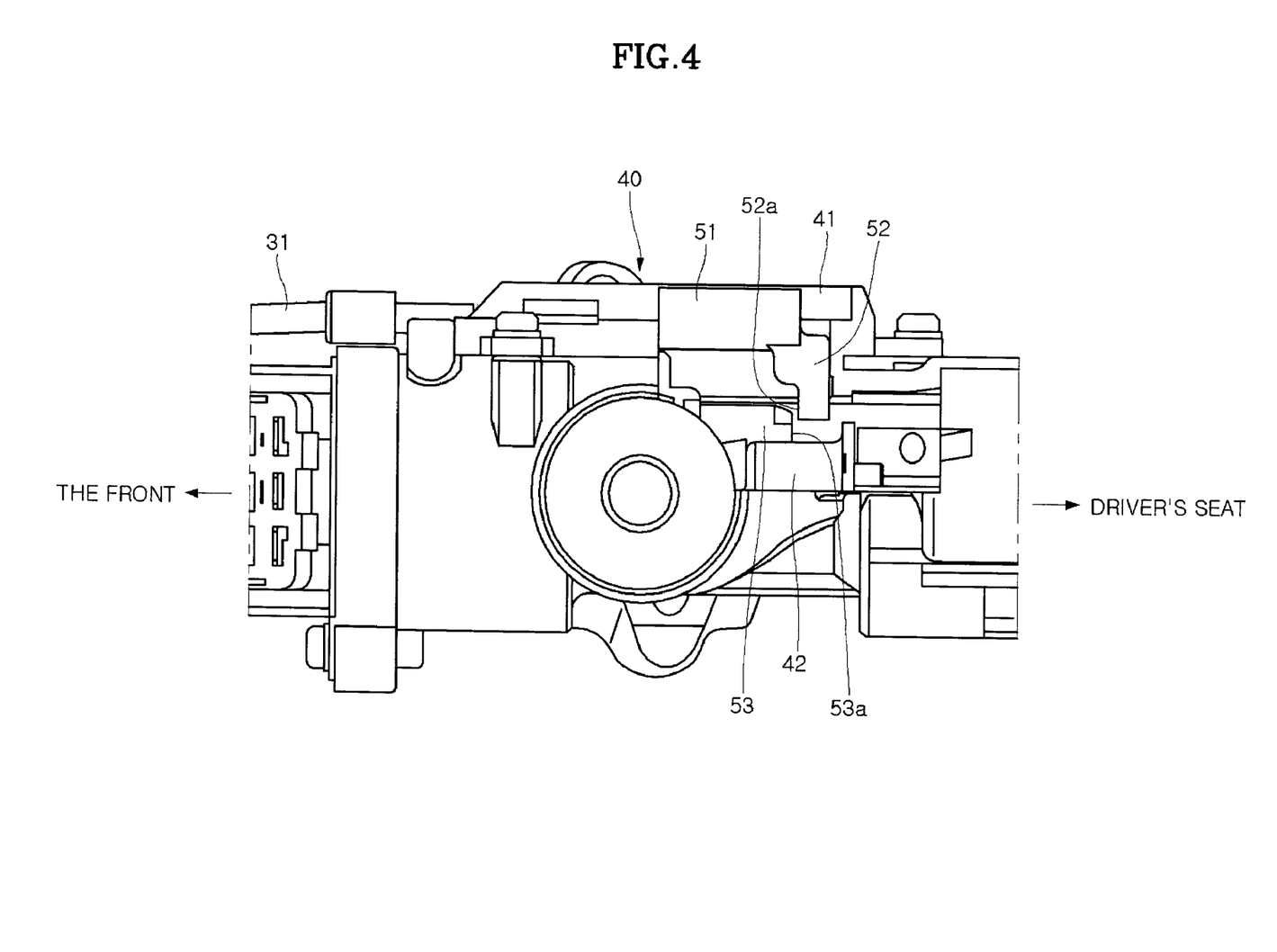

That is, ignition lock switch 40 has an ignition lock body 41 that is fixed to the steering column and an ignition lock cylinder 42 that is rotatably disposed in ignition lock body 41.

A guide groove 41a is formed on ignition lock body 41 in the longitudinal direction of ignition lock body 41 and a key hole where the key is inserted is formed at the front side of one end of ignition lock cylinder 42 which is open to the driver's seat.

As the key inserted in the key hole is turned, ignition lock cylinder 42 rotates in ignition lock body 41, such that the key is selectively positioned to LOCK←→ACC←→ON←→ST by the rotation of ignition lock cylinder 42.

A cable block 51 is disposed in guide groove 41a of ignition lock body 41 and can linearly move along guide groove 41a, and the other end of key interlock cable 31 is integrally connected to cable block 51.

A locking protrusion 52 that protrudes inside ignition lock body 41 is integrally formed with cable block 51 and a cylinder block 53 that restrains the linear motion of cable block 51 or the rotation of ignition lock cylinder 42 while contacting with locking protrusion 52 is integrally formed on the outer surface of ignition lock cylinder 42.

The operation of various embodiments according to the present invention is described hereafter.

Figure 1:
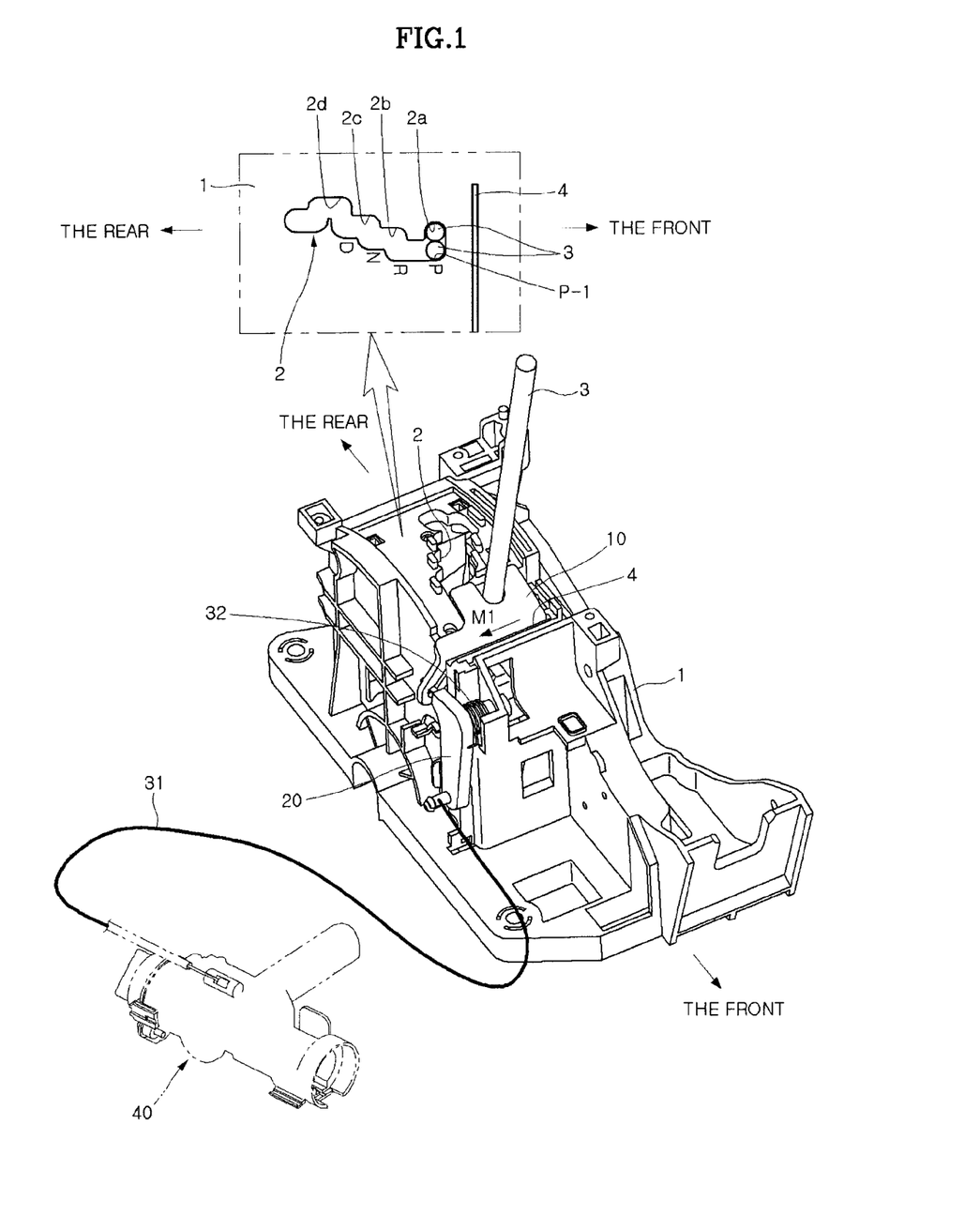
FIG. 1 is a view illustrating an exemplary key interlock system according to the present invention.
Figure 2:
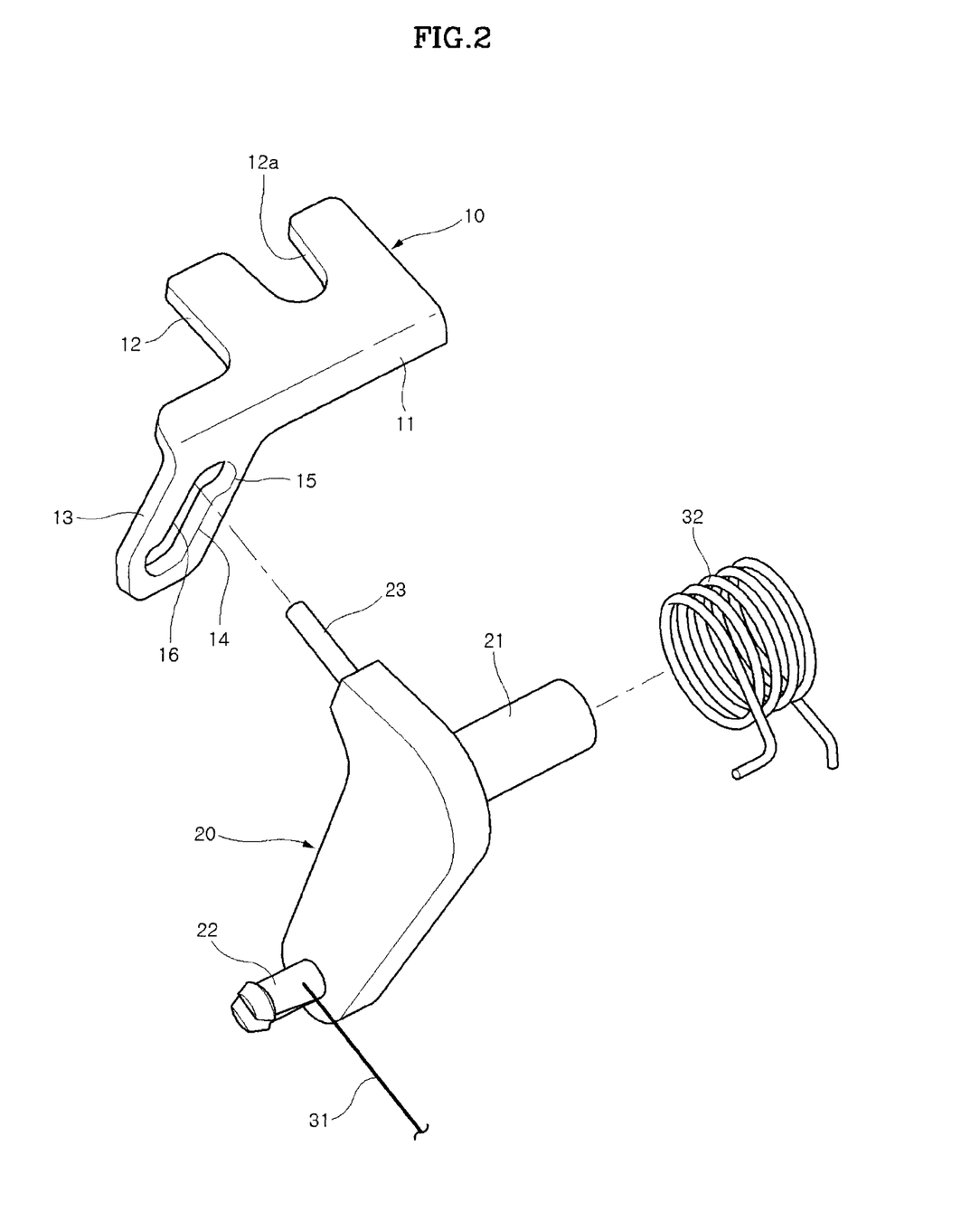
FIG. 2 is a view showing a locking plate and a key interlock cam included in the exemplary key interlock system of the present invention.

When a vehicle is parked, the key inserted in the key hole is positioned to 'LOCK' and shift lever 3 is positioned at P-range groove 2a as shown in FIG. 1, such that the key in the key hole can be easily removed from the key hole.

In this position, cable block 51, as shown in FIGS. 3 and 4, is positioned at one end of guide groove 4a, which faces the driver's seat, and a space is formed behind block protrusion 52 (at the side facing the front of a vehicle from block protrusion 52), such that cylinder block 53 of ignition lock cylinder 42 is positioned in the space.

Therefore, as cable block 51 linearly moves along guide groove 41a toward the front of the vehicle, the rear side 52a of block protrusion 52, which faces the front of the vehicle, comes in contact with the front side 53a of cylinder block 53, which faces the driver's seat. Accordingly, cable block 51 cannot linearly move along guide groove 41a toward the front of the vehicle.

As cable block 51 cannot linearly move toward the front of the vehicle in the positions shown in FIGS. 3 and 4, key interlock cable 31 cannot be pulled toward the rear of the vehicle in the position shown in FIG. 1 and key interlock cam 20 is restrained, that is, cannot rotate clockwise in the position shown in FIG. 1.

As key interlock cam 20 is restrained not to rotate, locking plate 10 cannot move in the direction of arrow M1 along guide groove 4 from the position shown in FIG. 1, such that it is impossible to move shift lever 3 positioned at P-range groove 2a in lever groove 12a of locking plate 10 to a P-range entrance P-1.

Therefore, since shift lever 3 at P-range groove 2a cannot be moved from the P-range to P-range entrance P-1 as described above, shift lever 3 cannot be shifted from P-range groove 2a to R-range groove 2b, N-range groove 2c, and D-range groove 2d, such that various embodiments of the present invention can satisfy requirements for a key interlock system.

Figure 5:
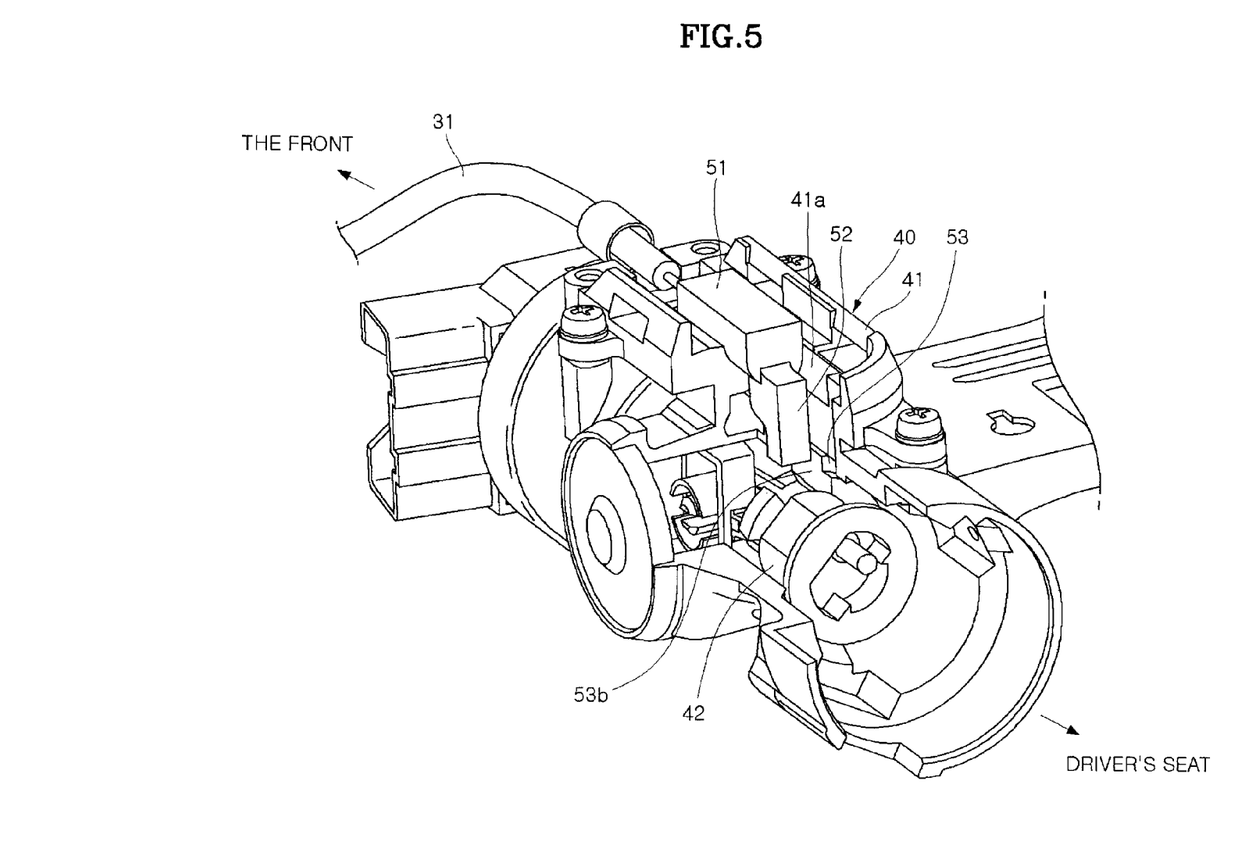
FIGS. 5 to 7 are views illustrating the operation of the exemplary key interlock system according to the present invention.
Figure 6:
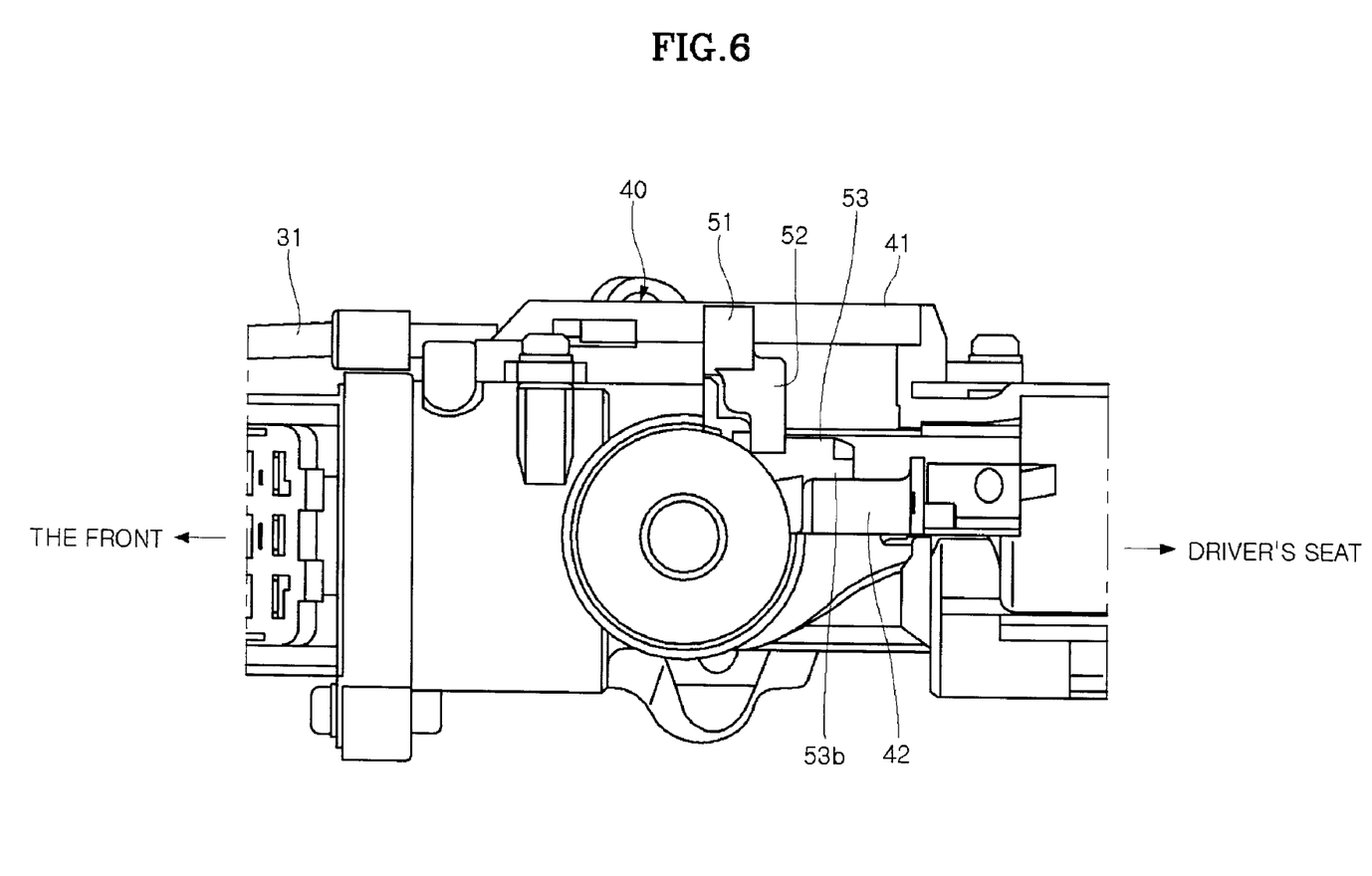

Further, as the key positioned at 'LOCK' is turned to 'ON', cylinder block 53 positioned in the space behind block protrusion 52 as shown in FIGS. 3 and 4 moves out of the space behind the space behind block protrusion 52 by the rotation of ignition cylinder block 42, as shown in FIGS. 5 and 6.

Figure 7:
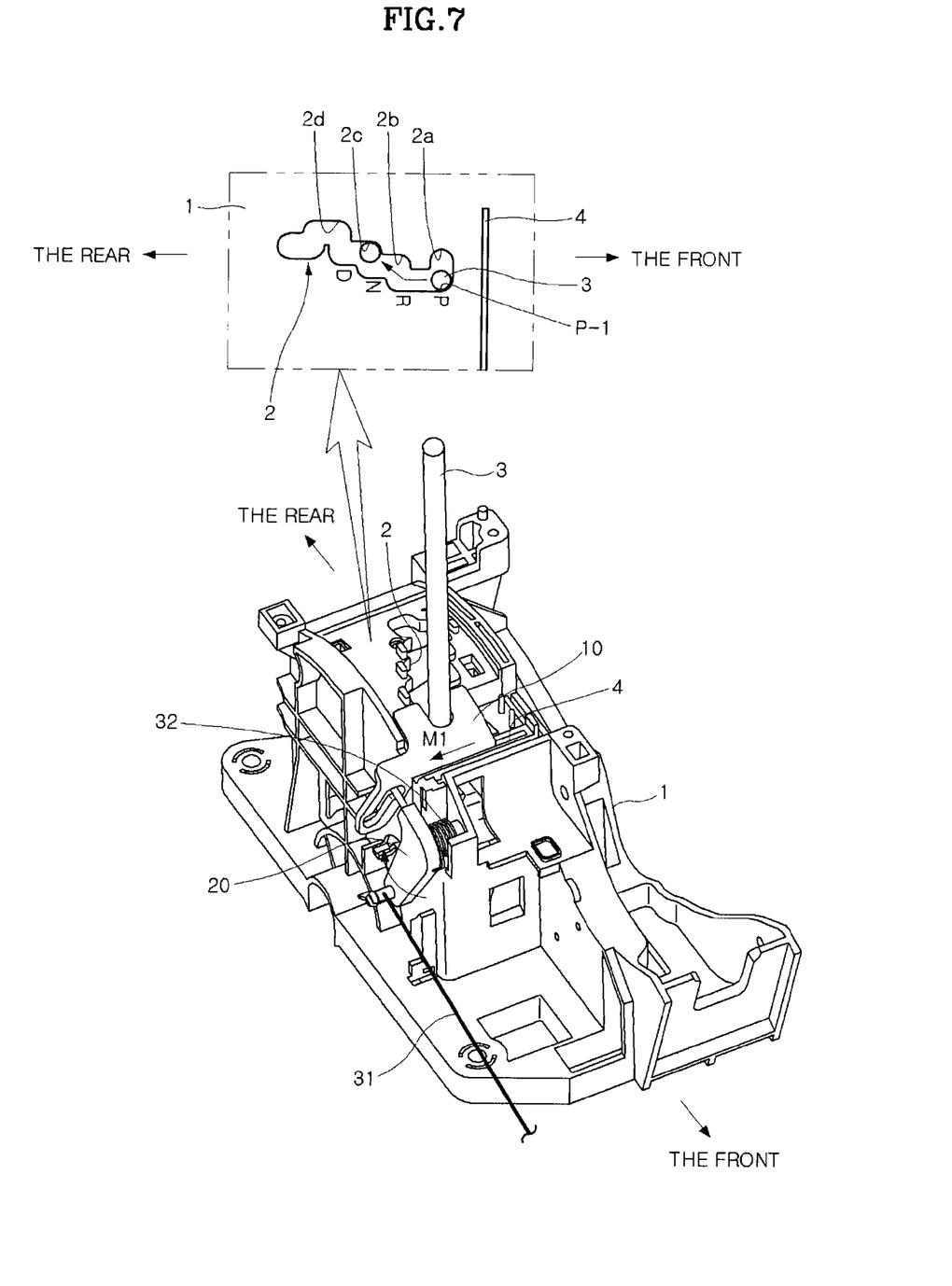

Accordingly, as cylinder block 53 rotates out of the space behind block protrusion 52 by turning the key to 'ON', cable block 51 can linearly move along guide groove 41a toward the front of the vehicle by a return force of the spring 32. As key interlock cam 20 rotates clockwise from the position shown in FIG. 1 to the position shown in FIG. 7 by the spring 32, cam protrusion 23 moves along the slot member 16 from the lower end to the horizontal slot 15 formed at the upper end thereof. As a result, the shift lever 3 positioned at P-range groove 2a can move to P-range entrance P-1 as shown in FIG. 7 while the locking plate 10 moves in the direction M1 along guide groove 4 by the movement of shift lever 3 as shown in FIG. 7.

Further, as key interlock cable 31 is pulled toward key interlock cam 20 by the spring 32, the cable block 51, as shown in FIGS. 5 and 6, moves toward the front of the vehicle along guide groove 41a and a guide channel 53b of cylinder block 53. When shift lever 3 moves to P-range entrance P-1, lever groove 12a of locking plate 10 is connected with R-range groove 2b, such that shift lever 3 can shift along range groove 2 to R-range groove 2b, N-range groove 2c, and D-range groove 2d.

The various embodiments of the present invention prevent the key in the key hole from being removed from the key hole unless the key positioned at 'LOCK' is turned to 'ON' and shift lever 3 positioned at any one of P-range entrance P-1, R-range groove 2b, N-range groove 2c, and D-range groove 2d is shift to P-range groove 2a.

That is, when the key is positioned at 'ON' and shift lever 3 positioned at any one of P-range entrance P-1, R-range groove 2b, N-range groove 2c, and D-range groove 2d, cylinder block 53 is positioned out of the space behind block protrusion 52 and guide channel 53b of cylinder block 53 receives the block protrusion 52 therein.

In this position, even if the key positioned at 'ON' is rotated to 'ACC' or 'LOCK', guide channel 53b of cylinder block 53 receives the block protrusion 52, such that ignition lock cylinder 42 cannot rotate. Therefore, the key cannot turn from 'ON' to 'ACC' or 'LOCK', and as a result, it is impossible to pull out the key from the key hole. Accordingly, the various embodiments of the present invention can satisfy requirements of a key interlock system.

In other words, the various embodiments of the present invention can satisfy a condition of a key interlock system that allows shift lever 3 inserted in P-range groove (Parking) 2a to be shifted to other ranges (R-range, N-range, and D-range) only by turning the key inserted in the key hole of ignition lock cylinder 42 to 'ON', and a condition of a key interlock system that allows the key to be removed from the key hole of ignition lock cylinder 42 only when shift lever 3 is positioned at P-range (Parking) 2a, by using a mechanical structure.

Further, the key interlock system according to various embodiments of the present invention can be manufactured at a low cost, does not make noise, and does not easily break down, as compared with electronic devices that have been widely used.

On the other hand, shift lever 3 positioned at other range grooves 2b, 2c, 2d than P-range groove 2a is positioned to P-range groove 2a through P-range entrance P-1 as shown in FIG. 7, locking plate 10 is moved in the opposite direction to the direction of arrow M1 along guide groove 4 from the position shown in FIG. 7 to the position shown in FIG. 1, by the movement of shift lever 3.

As locking plate 10 moves from the position shown in FIG. 7 to the position shown in FIG. 1, cam protrusion 23 positioned at the upper end of slot member 16 as shown in FIG. 7 moves downwards along the incline slot 14 of the slot member 16 to the lower end of slot member 16 while the cam protrusion 23 is pressed by the upper side of the incline slot 14. The key interlock cam 20 is turned in the opposite direction (counterclockwise) to the direction of arrow from the position shown in FIG. 7 to the position shown in FIG. 1, by the movement of cam protrusion 23.

When key interlock cam 20 is turned counterclockwise from the position shown in FIG. 7 and to the position shown in FIG. 1, cable block 51 that has moved to an end toward the front of the vehicle along guide groove 41a as shown in FIGS. 5 and 6, is moved, as shown in FIGS. 3 and 4, along guide groove 41a and positioned to the opposite end at the driver's seat.

When cable block 51 moves along guide groove 41a and is positioned at the opposite end at the driver's seat as shown in FIGS. 3 and 4, cylinder block 53 can rotate to the space behind block protrusion 52, such that the key inserted in the key hole can be moved to 'ON', 'ACC', and 'LOCK'. Therefore, it is possible to pull out the key from the key hole, at 'LOCK'.

For convenience in explanation and accurate definition in the appended claims, the terms "front" "rear", "upper", "lower", and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A key interlock system of a vehicle equipped with an automatic transmission, comprising:
  a key interlock cam that is rotatably mounted to a shift lever housing and elastically biased in one direction by an elastic member, one end of the key interlock cam being connected to one end of a key interlock cable;
  a locking plate slidably disposed in the shift lever housing, the locking plate having a slot member to which the other end of the key interlock cam is slidably inserted and a lever groove to which a shift lever is removably inserted;

a cable block slidably coupled to an ignition lock body and being movable along a longitudinal direction thereof, wherein the cable block is connected with the one end of the key interlock cam by the key interlock cable, and has a locking protrusion protruding inside the ignition lock body; and a cylinder block that is integrally formed with an ignition lock cylinder rotatably coupled to the ignition lock body therein and includes a guide channel to selectively receive the locking protrusion therein so as to restrain linear motion of the cable block or rotation of the ignition lock cylinder by retaining the locking protrusion therein while rotating with the ignition lock cylinder.

2. The key interlock system of the vehicle equipped with the automatic transmission as defined in claim 1, wherein the slot member includes:

an incline slot slanted with a predetermined angle with respect to a movement direction of the locking plate; and a horizontal slot formed an upper and/or lower end portion of the incline slot along the movement direction of the locking plate.

3. The key interlock system of the vehicle equipped with the automatic transmission as defined in claim 2, wherein the lever groove is formed on the locking plate in a perpendicular direction to the movement direction of the locking plate.

4. The key interlock system of the vehicle equipped with the automatic transmission as defined in claim 1, wherein the key interlock cam includes:

a rotary shaft that is rotatably fitted in the shift lever housing;

a cable protrusion where the one end of the key interlock cable is connected; and a cam protrusion that is inserted in the slot member of the locking plate.

5. The key interlock system of the vehicle equipped with the automatic transmission as defined in claim 4, wherein the elastic member is a spring that is wound around the rotary shaft and of which one end is supported by the shift lever housing and the other end is supported by the key interlock cam, in order to prevent free motion of the key interlock cam.

6. The key interlock system of the vehicle equipped with the automatic transmission as defined in claim 1, further comprising a guide groove formed in the shift lever housing to be open above the shift lever housing, wherein the locking plate is slidably inserted thereto and is positioned apart forward from a P-range groove of a range groove formed through the shift lever housing, on an upper surface of shift lever housing, and is cut such that one end portion thereof is open to one side of the shift lever housing and the other end portion thereof is closed.

7. The key interlock system of the vehicle equipped with the automatic transmission as defined in claim 6, wherein the locking plate has:

a plate protrusion that is slidably inserted in the guide groove of the shift lever housing;

a plate body that integrally bends from the plate protrusion toward the range groove and has the lever groove that is open in the longitudinal direction of the range groove such that the shift lever is inserted thereto; and a flange that is integrally formed with the plate protrusion to protrude from the one side of the shift lever housing through the open end portion of the guide groove and has the slot member that is longitudinally formed along the flange such that the cam protrusion is inserted thereto.

8. The key interlock system of the vehicle equipped with the automatic transmission as defined in claim 1, wherein the locking protrusion and the guide channel are engaged while a start key is positioned at "ON".

\* \* \* \* \*